US 8,064,731 B2

(12) United States Patent
Zouhar et al.

(10) Patent No.: US 8,064,731 B2
(45) Date of Patent: Nov. 22, 2011

(54) GENERALIZED RIGID ALIGNMENT OF 3D EAR IMPRESSION MODELS

(75) Inventors: Alexander Zouhar, Plainsboro, NJ (US); Gregory G. Slabaugh, Princeton, NJ (US); Gozde Unal, Plainsboro, NJ (US); Tong Fang, Morganville, NJ (US)

(73) Assignee: Siemens Audiologische Technik GmbH, Erlangen ( * ) Notice: Subject to any disclaimer, the term of this patent is extended or adjusted under 35 U.S.C. 154(b) by 1055 days.

(21) Appl. No.: 11/933,568

(22) Filed: Nov. 1, 2007

(65) Prior Publication Data

US 2008/0137949 A1    Jun. 12, 2008

Related U.S. Application Data

(60) Provisional application No. 60/865,510, filed on Nov. 13, 2006.

(51) Int. Cl.
*G06K 9/32* (2006.01)
*G06K 9/00* (2006.01)
*G06F 19/00* (2011.01)
*G06T 15/00* (2011.01)

(52) U.S. Cl. ........ 382/294; 382/128; 382/154; 382/168; 382/295; 382/296; 345/419; 700/98

(58) Field of Classification Search ................ None
See application file for complete search history.

(56) References Cited

U.S. PATENT DOCUMENTS

| 7,050,876 | B1 * | 5/2006 | Fu et al. ................. 700/118 |
| 7,187,809 | B2 * | 3/2007 | Zhao et al. ............... 382/285 |
| 2007/0057942 | A1 | 3/2007 | Unal et al. |
| 2007/0058829 | A1 | 3/2007 | Unal et al. |

FOREIGN PATENT DOCUMENTS

| EP | 1 246 507 A1 | 10/2002 |
| WO | WO 02/30157 A | 4/2002 |

OTHER PUBLICATIONS

Makadia et al. "Fully automatic registration of 3d point clouds", IEEE CVPR'06, pp. 1-8.*
Li et al. "3d registration of ultrasound images based on morphology skeleton", Proceedings of the 2005 IEEE Engineering in medicine and biology 27th annual conference, pp. 6309-6312.*
Zinssee et al., "A refined icp algorithm for robust 3-d correspondence estimation", Proceedings 2003 Int'l Conf. on Image Processing, ICIP-2003, Barcelona, Spain, Sep. 14-17, 2003, vol. VOL 2 of 3, pp. 695-698.*

(Continued)

*Primary Examiner* — Tom Y Lu
*Assistant Examiner* — Thomas Conway

(57) ABSTRACT

A method for rigid registration of ear impression models, including: extracting a canal region from an undetailed ear impression model, the undetailed ear impression model representing an undetailed surface of an ear canal and outer ear geometry; extracting a canal region from a detailed ear impression model, the detailed ear impression model representing a detailed surface of the ear canal; generating an orientation histogram for the canal region of the undetailed ear impression model and an orientation histogram for the canal region of the detailed ear impression model; performing a rotational alignment between the orientation histograms; computing a translational shift between the canal regions after performing the rotational alignment; and performing a registration between the undetailed and detailed ear impression models after computing the translational shift.

19 Claims, 12 Drawing Sheets

OTHER PUBLICATIONS

Makadia et al., "Fully automatic registration of 3D point clouds", Computer Vision and Pattern Recognition, 2006 IEEE Computer Society Conference on New York, NY, Jun. 17-22, 2006, pp. 1297-1304.

Dandan et al., "3D registration of ultrasound images based on morphology skeleton", Engineering in Medicine and Biology Society, 2005, $27_{th}$ Annual Int'l Conf. of the Shanghai, China, Sep. 1-4, 2005, pp. 6309-6312.

Zinssee et al., "A refine icp algorithm for robust 3-d correspondence estimation", Proceedings 2003 Int'l Conf. on Image Processing, ICIP-2003, Barcelona, Spain, Sep. 14-17, 2003, vol. VOL 2 of 3, pp. 695-698.

Zhang, "Iterative point matching for registration of free-form curves and surfaces", International Journal of Computer Vision, Kluwer Academic Publishers, Norwell, US, vol. 13, No. 2, Oct. 1, 1994, pp. 119-152.

Kostelec, Peter J. et al. "FFTs on the Rotation Group," (2003).

Besl, P. J. et al. "A Method for Registration of 3-d shapes," (1992) *IEEE Trans. Pattern Analysis and Machine Intelligence*, vol. 14 pp. 239-256.

Zouhar, A. et al. "Anatomically-Aware, Automatic, and Fast Registration of 3D Ear Impression Models," (2006) *Proceedings 3DPVT*.

Horn, B. "Extended Gaussian Images," *Proc. of the IEEE* (1984) 72:12 pp. 1671-1686.

Rusinkiewicz s. et al, "Efficient Variants of the ICP Algorithm," *Proceedings of the Third International Conference on 3-D Digital Imaging and Modeling*, (2001).

Makadia, A. et al. "Fully Automatic Registration of 3D Point Clouds," *Proceedings CVPR*, (2006).

* cited by examiner (b)

(a)

(a)          (b)

(a) (b)

GENERALIZED RIGID ALIGNMENT OF 3D EAR IMPRESSION MODELS

CROSS-REFERENCE TO RELATED APPLICATION

This application claims the benefit of U.S. Provisional Application No. 60/865,510, filed Nov. 13, 2006, the disclosure of which is incorporated by reference herein in its entirety.

BACKGROUND OF THE INVENTION

1. Technical Field

The present invention relates to the manufacturing of hearing aids, and more particularly, to the alignment of undetailed and detailed surface models of 3D ear impressions.

2. Discussion of the Related Art

The development of accurate and robust alignment algorithms for 3D surfaces is a fundamental task with numerous applications in different fields such as computer vision, manufacturing processes (e.g., tolerance inspection of machined parts) and robotics, and has been widely investigated in the literature. Examples of recent work in this field, with particular application to hearing aides, include: U.S. Patent Application Publication No. 20070058829, entitled "Method and Apparatus for the Rigid and Non-Rigid Registration of 3D Shapes", the disclosure of which is incorporated by reference herein in its entirety, and A. Zouhar, G. Unal. T. Fang, G. Slabaugh, H. Xie, and F. McBagonluri, "Anatomically-Aware, Automatic, and Fast Registration of 3D Ear Impression Models," Proceedings 3DPVT'06, 2006, the disclosure of which is incorporated by reference herein in its entirety.

In A. Zouhar, G. Unal, T. Fang, C. Slabaugh, H. Xie, and F. McBagonluri, "Anatomically-Aware, Automatic, and Fast Registration of 3D Ear Impression Models," Proceedings 3DPVT'06, 2006, a fully automatic registration framework of 3D ear impression models represented in the point cloud domain was presented. However, this method is limited to the registration of raw (i.e., undetailed) ear impression models. In U.S. Patent Application Publication No. 20070058829, a rigid registration method between undetailed and detailed ear impression models with an implicit surface registration was presented. However, this algorithm cannot be conveniently applied to surfaces represented explicitly.

Accordingly, there is exists a need for a generalized, automatic and fast rigid registration method between undetailed and detailed ear impression models.

SUMMARY OF THE INVENTION

In an exemplary embodiment of the present invention, a method for rigid registration of ear impression models comprises: extracting a canal region from an undetailed ear impression model, the undetailed ear impression model representing an undetailed surface of an ear canal and outer ear geometry; extracting a canal region from a detailed ear impression model, the detailed ear impression model representing a detailed surface of the ear canal; generating an orientation histogram for the canal region of the undetailed ear impression model and an orientation histogram for the canal region of the detailed ear impression model; performing a rotational alignment between the orientation histograms; computing a translational shift between the canal regions after performing the rotational alignment; and performing a registration between the undetailed and detailed ear impression models after computing the translational shift.

The canal region is extracted from the detailed ear impression model by using a length of the canal region of the undetailed ear impression model.

Performing a rotational alignment between the orientation histograms comprises: representing the canal region of the undetailed ear impression model as an Extended Gaussian Image (EGI); representing the canal region of the detailed ear impression model as an EGI; and computing a correlation function between the EGIs in the Fourier spectrum.

Computing a translational shift between the canal regions comprises: defining a skeleton of the canal region of the undetailed ear impression model as a set of center points extending from a tip of the canal region of the undetailed ear impression model to an aperture of the undetailed ear impression model, the center points defining a centerline having a first length; defining a skeleton of the canal region of the detailed ear impression model as a set of center points extending from a tip of the canal region of the detailed ear impression model to a bottom plane of the detailed ear impression model, the center points in the canal region of the detailed ear impression model defining a centerline having a second length, wherein the second length is greater than the first length; matching the first length with the second length by defining a shape distance measure based on an approximated local curvature of the center points of the undetailed and detailed ear impression models; and computing a mass center of the center points of the undetailed ear impression model that match the center points of the detailed ear impression model and a mass center of the center points of the detailed ear impression model that match the center points of the undetailed ear impression model, wherein a difference between the mass centers is the translational shift.

Performing a registration between the undetailed and detailed ear impression models comprises: performing a ray cast surface distance measure to identify cloud points of the detailed ear impression model that are near a lip of the canal region of the detailed ear impression model and cloud points of the detailed ear impression model that do not closely correspond to cloud points of the undetailed ear impression model; representing the cloud points of the undetailed ear impression model in a k-dimensional (KD)-Tree data structure; and performing an iterative closest point (ICP) algorithm on the cloud points of the undetailed ear impression model in the KD-Tree data structure and on the cloud points of the detailed ear impression model except the cloud points of the detailed ear impression model identified by the ray cast surface distance measure.

The method further comprises aligning the detailed ear impression model with the undetailed ear impression model by using a registration result that is obtained by performing the registration between the undetailed and detailed ear impression models.

The registration result includes rotation and translation rigid transformation parameters that bring the detailed ear impression model into alignment with the undetailed ear impression model.

In an exemplary embodiment of the present invention, a system for rigid registration of ear impression models comprises: a memory device for storing a program; a processor in communication with the memory device, the processor operative with the program to: extract a canal region from an undetailed ear impression model, the undetailed ear impression model representing an undetailed surface of an ear canal and outer ear geometry, extract a canal region from a detailed ear impression model, the detailed ear impression model representing a detailed surface of the ear canal; generate an orientation histogram for the canal region of the undetailed ear impression model and an orientation histogram for the canal region of the detailed ear impression model; perform a rotational alignment between the orientation histograms; compute a translational shift between the canal regions after performing the rotational alignment; and perform a registration between the undetailed and detailed ear impression models after computing the translational shift.

The canal region is extracted from the detailed ear impression model by using a length of the canal region of the undetailed ear impression model.

The processor is further operative with the program when performing a rotational alignment between the orientation histograms to: represent the canal region of the undetailed ear impression model as an EGI; represent the canal region of the detailed ear impression model as an EGI; and compute a correlation function between the EGIs in the Fourier spectrum.

The processor is further operative with the program when computing a translational shift between the canal regions to: define a skeleton of the canal region of the undetailed ear impression model as a set of center points extending from a tip of the canal region of the undetailed ear impression model to an aperture of the undetailed ear impression model, the center points defining a centerline having a first length; define a skeleton of the canal region of the detailed ear impression model as a set of center points extending from a tip of the canal region of the detailed ear impression model to a bottom plane of the detailed car impression model, the center points in the canal region of the detailed ear impression model defining a centerline having a second length, wherein the second length is greater than the first length; match the first length with the second length by defining a shape distance measure based on an approximated local curvature of the center points of the undetailed and detailed ear impression models; and compute a mass center of the center points of the undetailed ear impression model that match the center points of the detailed ear impression model and a mass center of the center points of the detailed ear impression model that match the center points of the undetailed ear impression model, wherein a difference between the mass centers is the translational shift.

The processor is further operative with the program when performing a registration between the undetailed and detailed ear impression models to: perform a ray cast surface distance measure to identify cloud points of the detailed ear impression model that are near a tip of the canal region of the detailed ear impression model and cloud points of the detailed ear impression model that do not closely correspond to cloud points of the undetailed ear impression model; represent the cloud points of the undetailed ear impression model in a KD-Tree data structure; and perform an ICP algorithm on the cloud points of the undetailed ear impression model in the KD-Tree data structure and on the cloud points of the detailed ear impression model except the cloud points of the detailed ear impression model identified by the ray cast surface distance measure.

The processor is further operative with the program to align the detailed ear impression model with the undetailed ear impression model by using a registration result that is obtained by performing the registration between the undetailed and detailed ear impression models.

The registration result includes rotation and translation rigid transformation parameters that bring the detailed ear impression model into alignment with the undetailed ear impression model.

In an exemplary embodiment of the present invention, a computer readable medium tangibly embodying a program of instructions executable by a processor to perform method steps for rigid registration of ear impression models, the method steps comprising: extracting a canal region from an undetailed ear impression model, the undetailed ear impression model representing an undetailed surface of an ear canal and outer ear geometry; extracting a canal region from a detailed ear impression models the detailed ear impression model representing a detailed surface of the ear canal; generating an orientation histogram for the canal region of the undetailed ear impression model and an orientation histogram for the canal region of the detailed ear impression model; performing a rotational alignment between the orientation histograms; computing a translational shift between the canal regions after performing the rotational alignment; and performing a registration between the undetailed and detailed ear impression models after computing the translational shift.

The canal region is extracted from the detailed ear impression model by using a length of the canal region of the undetailed ear impression model.

The instructions for performing a rotational alignment between the orientation histograms comprise instructions for: representing the canal region of the undetailed ear impression model as an EGI; representing the canal region of the detailed ear impression model as an EGI; and computing a correlation function between the EGIs in the Fourier spectrum.

The instructions for computing a translational shift between the canal regions comprise instructions for: defining a skeleton of the canal region of the undetailed ear impression model as a set of center points extending from a tip of the canal region of the undetailed ear impression model to an aperture of the undetailed ear impression model, the center points defining a centerline having a first length; defining a skeleton of the canal region of the detailed ear impression model as a set of center points extending from a tip of the canal region of the detailed ear impression model to a bottom plane of the detailed ear impression model, the center points in the canal region of the detailed ear impression model defining a centerline having a second length, wherein the second length is greater than the first length; matching the first length with the second length by defining a shape distance measure based on an approximated local curvature of the center points of the undetailed and detailed ear impression models; and computing a mass center of the center points of the undetailed ear impression model that match the center points of the detailed ear impression model and a mass center of the center points of the detailed ear impression model that match the center points of the undetailed ear impression model, wherein a difference between the mass centers is the translational shift.

The instructions for performing a registration between the undetailed and detailed ear impression models comprise instructions for: performing a ray cast surface distance measure to identify cloud points of the detailed ear impression model that are near a tip of the canal region of the detailed ear impression model and cloud points of the detailed ear impression model that do not closely correspond to cloud points of the undetailed ear impression model; representing the cloud points of the undetailed ear impression model in a KD-Tree data structure; and performing an ICP algorithm on the cloud points of the undetailed ear impression model in the KD-Tree data structure and on the cloud points of the detailed ear impression model except the cloud points of the detailed ear impression model identified by the ray cast surface distance measure.

The computer readable medium further comprising instructions for aligning the detailed ear impression model with the undetailed ear impression model by using a registration result that is obtained by performing the registration between the undetailed and detailed ear impression models.

The registration result includes rotation and translation rigid transformation parameters that bring the detailed ear impression model into alignment with the undetailed ear impression model.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

In the manufacturing of hearing aids, a raw or undetailed ear impression model represents the surface of the ear canal and outer ear geometry. This undetailed ear impression model is then geometrically manipulated using cutting, smoothing, tapering, etc. In the following, we present a generalized framework for rigid registration of 3D ear impression models, in accordance with an exemplary embodiment of the present invention. The framework/method is designed to provide accurate registration of detailed/undetailed ear impression models, in addition to detailed/detailed and undetailed/undetailed ear impression models.

The method decomposes registering detailed/undetailed ear impression models into two parts: 1) estimating the orientation and 2) estimating the translation that brings the two ear impression models into alignment. Both of these estimates utilize anatomic information of the surfaces, computed using a feature detection approach. These estimates provide an initial registration that is then refined using the iterative closet point (ICP) algorithm.

Note that when we say "detailed ear impression model" we mean, for example, the device type known as Completely-In-Canal (CIC), which basically consists of the canal region only (all other parts of the surface are removed during detailing processing). An example of this is provided in FIG. 3B.

The following section provides an overview of the method together with some background information. Subsequent sections describe each step of the method in detail.

Overview of the Method

Consider, for example, the following scenario: a customer needs a remake for a device due to an inaccurate fit. In order to find out the reason for the inaccurate fit, a new impression taken from the patient's ear is aligned with the current detailed model to uncover adverse differences. In turn, those regions undergo refinements to address the customer's needs. Critical to this process is the accurate registration of the new impression and the current detailed model.

Figure 1:
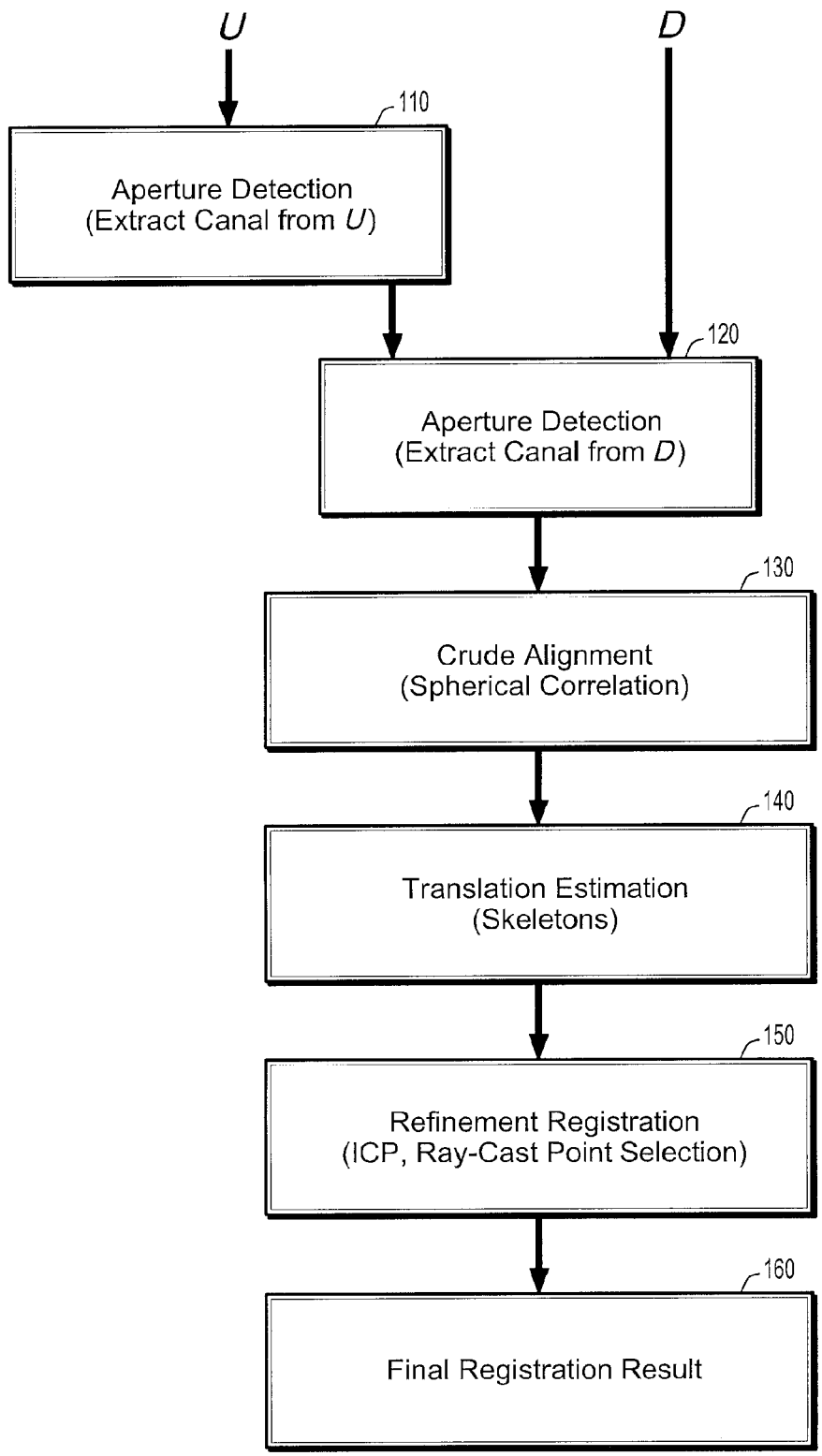
FIG. 1 is a flowchart of a method for rigid registration of ear impression models according to an exemplary embodiment of the present invention.

FIG. 1 presents an overview of the method. At the beginning, a shape analysis (step 110) as described in A. Zouhar, G. Unal, T. Fang, G. Slabaugh, H. Xie, and F. McBagonluri, "Anatomically-Aware, Automatic, and Fast Registration of 3D Ear Impression Models," Proceedings 3DPVT'06, 2006, is required to extract the corresponding canal region from the undetailed ear impression model. The surface part above the aperture is referred to as the canal, canal region or canal part. Currently for a detailed ear impression model the aperture cannot be detected directly. We tackle this by using canal length information of the undetailed ear impression model (step 120). An alternative is to use the surfaces of U and D directly for the spherical correlation. This alternative is similar to the approach discussed in A. Makadia, A. Patterson IV, and K. Daniilidis, "Fully Automatic Registration of 3D Point Clouds," Proceedings CVPR'06, 2006, the disclosure of which is incorporated by reference herein in its entirety.

Next, for each surface we generate Extended Gaussian Image (EGI) representations as described in B. Horn, "Extended Gaussian Images," Proc. of the IEEE, vol. 72, no. 12, pp. 1671-1686, 1984, the disclosure of which is incorporated by reference herein in its entirety, or orientation histograms, from the surface normals of the object (step 130). Here, we perform a rotational alignment between orientation histograms using spherical correlation in SO(3) as described in A. Makadia, A. Patterson IV, and K. Daniilidis, "Fully Automatic Registration of 3D Point Clouds," Proceedings CVPR'06, 2006. The SOFT package as described in P. J. Kostelec and D. N. Rockmore, "FFTs on the Rotation Group," 2003, the disclosure of which is incorporated by reference herein in its entirety, can be used to transform spherical functions (orientation histograms) into their spherical harmonic representation in order to find the best correlation therebetween. In Fourier space, this operation can be performed much faster.

Since EGI representations are translation invariant, we must additionally address the translation. Unlike A. Makadia, A. Patterson IV, and K. Daniilidis, "Fully Automatic Registration of 3D Point Clouds," Proceedings CVPR'06, 2006, which estimates the translation by correlating 3D volumetric histograms, we instead compute the translation as the difference between the mass centers of the corresponding parts of the two canal centerlines (step 140). This approach is significantly simpler, faster, and tailored to registering detailed/undetailed ear impression models. Again, a more direct alternative would be to use the method in A. Makadia, A. Patterson IV, and K. Daniilidis, "Fully Automatic Registration of 3D Point Clouds," Proceedings CVPR'06, 2006 and to estimate the translation using a correlation-based formulation. We will describe the translation estimation in more detail in a later section entitled "Translation Estimation", For refinement registration, we use the standard ICP algorithm where the target surface points are represented in a k-dimensional (KD)-Tree data structure to increase search efficiency (step 150). Through our experiments we learned that the use of all feature points of the detailed surface can sometimes lead to inaccurate registration results. To avoid this we discard points of the detailed ear impression model, which have no close correspondence to the undetailed template using a novel ray cast surface distance measure that is explained in a later section entitled "Refinement Registration". After applying the refinement transformation we obtain the final registration result (step 160).

Registration Algorithm

Aperture Detection

Figure 2:
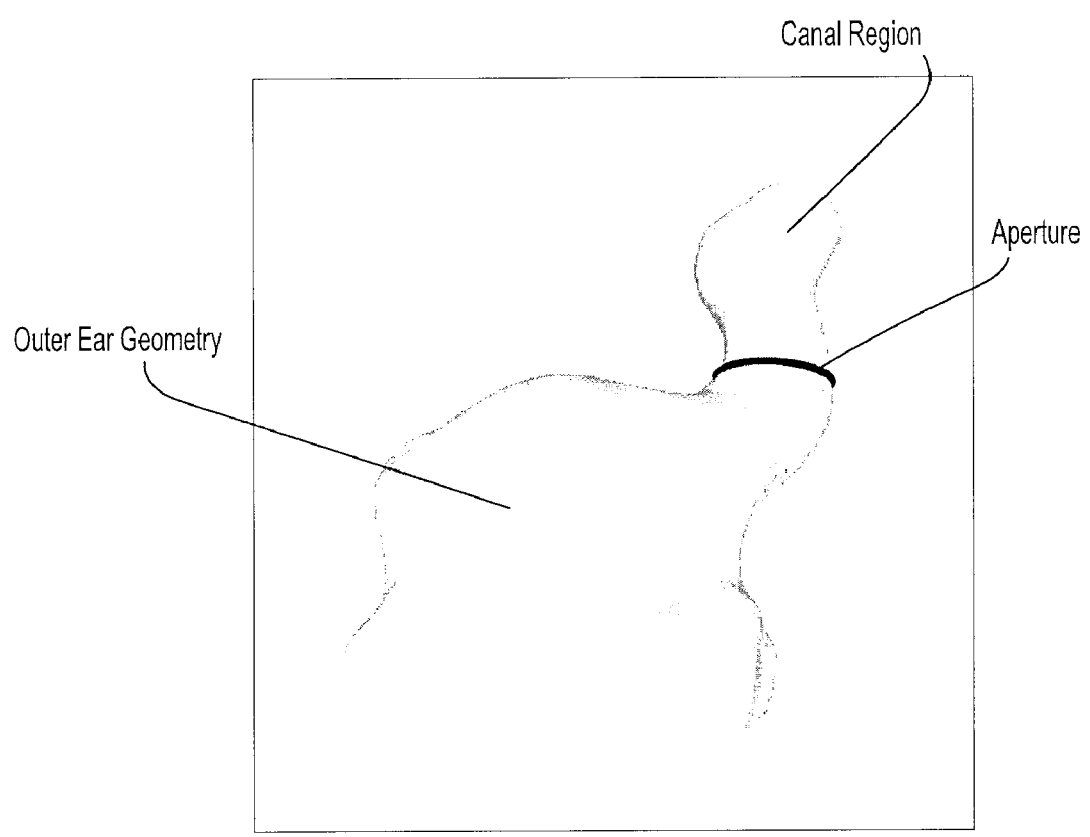
FIG. 2 depicts an aperture of an undetailed ear impression model.

In A. Zouhar, G. Unal, T. Fang, G. Slabaugh, H. Xie, and F. McBagonluri, "Anatomically-Aware, Automatic, and Fast Registration of 3D Ear Impression Models," Proceedings 3DPVT'06, 2006, the complex shape analysis procedure of the aperture detection for raw, undetailed ear impression models U was described. The main idea of this algorithm is to slice through the surface with a plane starting at the canal tip and to detect feature points of key anatomical regions from the resulting heap of contour lines automatically. The aperture of a human ear impression is considered as a characteristic contour that connects canal and remaining impression body. More or less it is the entrance region of the canal. FIG. 2 depicts an example of the aperture contour for an undetailed ear impression model U detected by the algorithm of A. Zouhar, G. Unal, T. Fang, G. Slabaugh, H. Xie, and F. MeBagonluri, "Anatomically-Aware, Automatic, and Fast Registration of 3D Ear Impression Models," Proceedings 3DPVT'06, 2006.

Figure 3A:
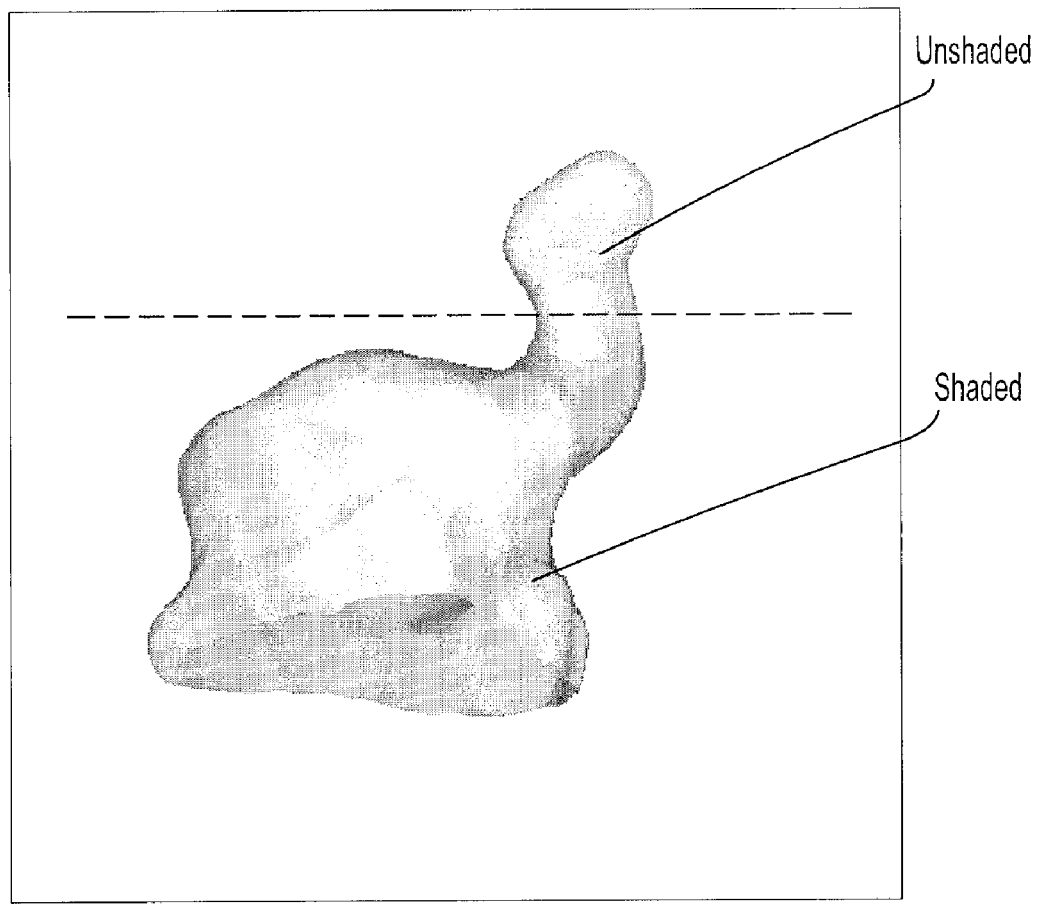
FIG. 3A depicts remaining surface parts of an undetailed ear impression model for Extended Gaussian Image (EGI) generation.
Figure 3B:
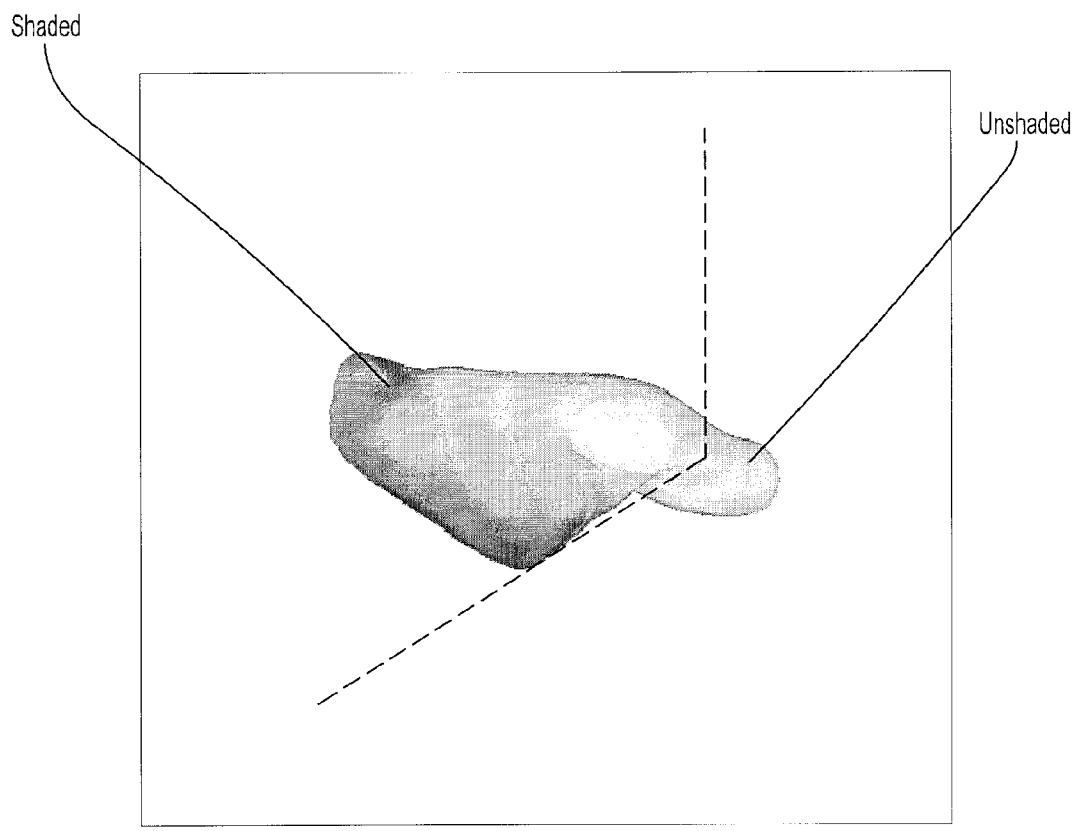
FIG. 3B depicts remaining surface parts of a detailed ear impression model for EGI generation.

The algorithm of A. Zouhar, G. Unal, T. Fang, C. Slabaugh, H. Xie, and F. McBagonluri, "Anatomically-Aware, Automatic, and Fast Registration of 3D Ear Impression Models," Proceedings 3DPVT'06, 2006 does not allow aperture detection for detailed ear impression models D. To detect an aperture contour for a detailed ear impression model D in accordance with an embodiment of the present invention, as for U we detect the opening of D and define a plane to scan the surface, starting at the tip towards the bottom. Since we know the distance between the tip and the center of the aperture contour of U, we apply this measure as a rule and keep only the part of D, which has the same distance from the tip of D to the center of the pertinent contour c of D. We can think of c as an approximation of the aperture of D. In FIGS. 3A and 3B the shaded areas correspond to areas of U and D which are located above their apertures.

In the next section, we will use the two canal parts to build the EGI's/orientation histograms.

Orientation Histograms

Figure 4:
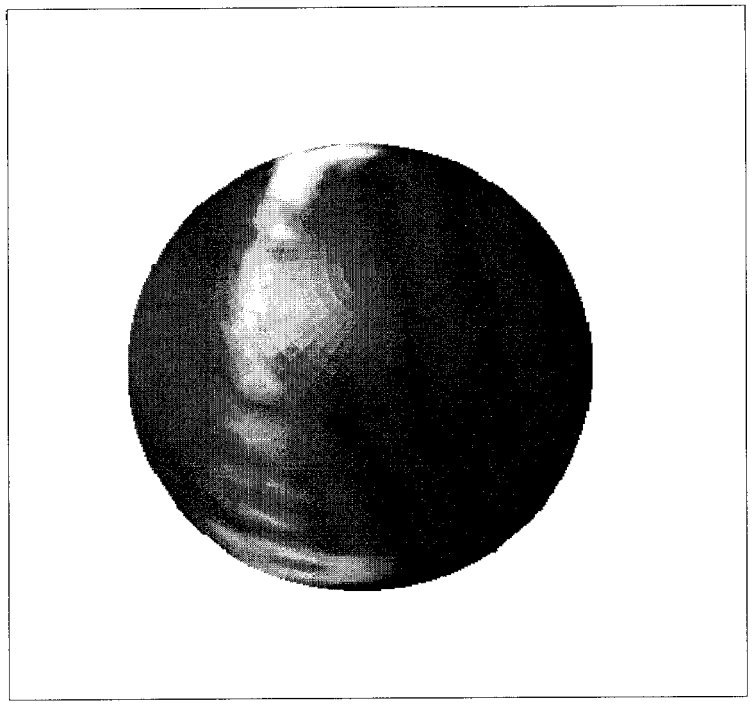
FIG. 4 depicts an orientation histogram for a canal region of the undetailed ear impression model and an orientation histogram for a canal region of the detailed ear impression model.
Figure 4:
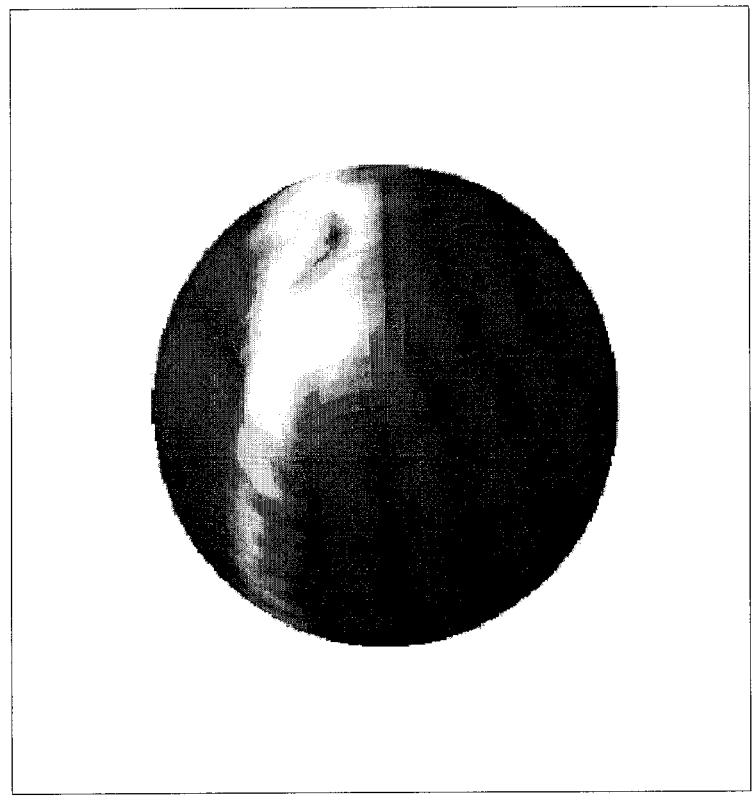

After the apertures for both U and D are detected, we can generate the EGIs of their canal regions (the region above the aperture). Since EGIs can be effectively approximated by spherical histograms of surface orientations, we use the terms EGI and orientation histogram interchangeably. Although the EGI may seem like a simple accumulation of surface normals, it provides a very powerful representation because it allows for the direct recovery of orientation independent of any translational shift present. Using spherical correlation in SO(3) as described in A. Makadia, A. Patterson IV, and K. Daniilidis, "Fully Automatic Registration of 3D Point Clouds," Proceedings CVPR'06, 2006, we generate the EGIs for the canal parts of U and D. As an example, FIG. 4 depicts an orientation histogram for a canal region of an undetailed ear impression model (image (a)) and an orientation histogram for a canal region of a detailed ear impression model (image (b)).

Rotational Alignment and Spherical Correlation

We want to find the best rotational estimate based on orientation histograms. This can be obtained by exhaustively traversing the space of rotations to find the one which maximizes the correlation between EGIs, which means all rotations $R \in SO(3)$ have to be considered. Since we do not have any prior estimate of the rotation, we cannot assume a reduction of the possible solution space. According to A. Makadia, A. Patterson IV, and K. Daniilidis, "Fully Automatic Registration of 3D Point Clouds," Proceedings CVPR'06, 2006, the global correlation function can be computed as $$G(R) = \int_{\omega \in S_2} H_1(\omega) H_2(R^T \omega) d\omega. \qquad (1)$$

Here $H_{1,2}(\omega)$ are the orientation histograms generated from the two ear impression models. In the discrete setting, the total complexity to obtain G(R) is on the order of $O(M^3 N^2)$, where N is the size of the spherical histograms and M represents the number of samples in each dimension of SO(3). Suppose our required accuracy for correlation is less than 1°, i.e., M=360, and the number of histogram bins is 128×128. Then, the time complexity for rotational alignment is about $360^3 128^2$ which is unacceptable for a practical application. Thus, following A. Makadia, A. Patterson IV, and K. Daniilidis, "Fully Automatic Registration of 3D Point Clouds," Proceedings CVPR'06, 2006, we adopted the spherical harmonics representation of EGIs and compute the correlation function in the Fourier spectrum which dramatically reduces the time complexity, since in this domain the correlation integral can be expressed as a simple pointwise multiplication. The spherical correlation approach is very similar to the correlation of planar functions. A thorough treatment of spherical harmonics can be found in G. Arfken and H. Weber, Mathematical Methods for Physicists, Academic Press, 1966, the disclosure of which is incorporated by reference herein in its entirety. The software package named SOFT includes a technique for efficient calculation of spherical correlation problems. Assuming the size of the spherical histogram is $O(N^2)$, i.e., there are N+1 samples in each of three Euler angles, then the SOFT package leaves us with an accuracy up to $$\pm \left( \frac{180}{N+1} \right)^\circ$$

in $\alpha$ and $\gamma$ and $$\pm \left( \frac{90}{N+1} \right)^\circ$$

in β. Now the total time complexity is $N^3 \log^2 N$.

Figure 5:
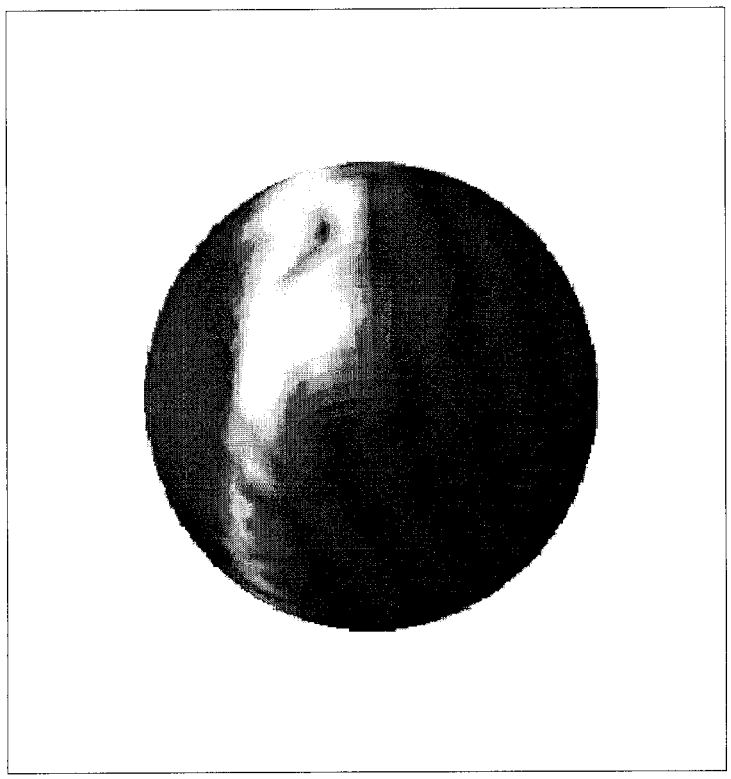
FIG. 5 depicts the orientation histograms of FIG. 4 after rotational alignment.
Figure 5:
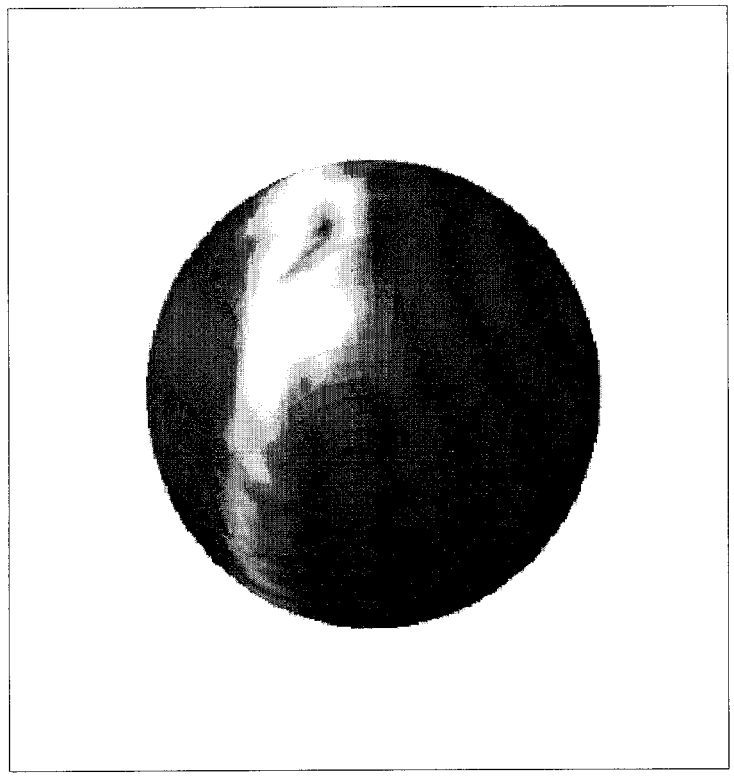

In our case, using the SOFT package with N=128, the time for the rotation estimation will only be about one second. FIG. 5 shows an alignment example. In particular, FIG. 5 shows the orientation histogram for the canal part after rotational alignment of the undetailed ear impression model (image (a)) and the detailed ear impression model (image (b)).

Translation Estimation

Figure 6A:
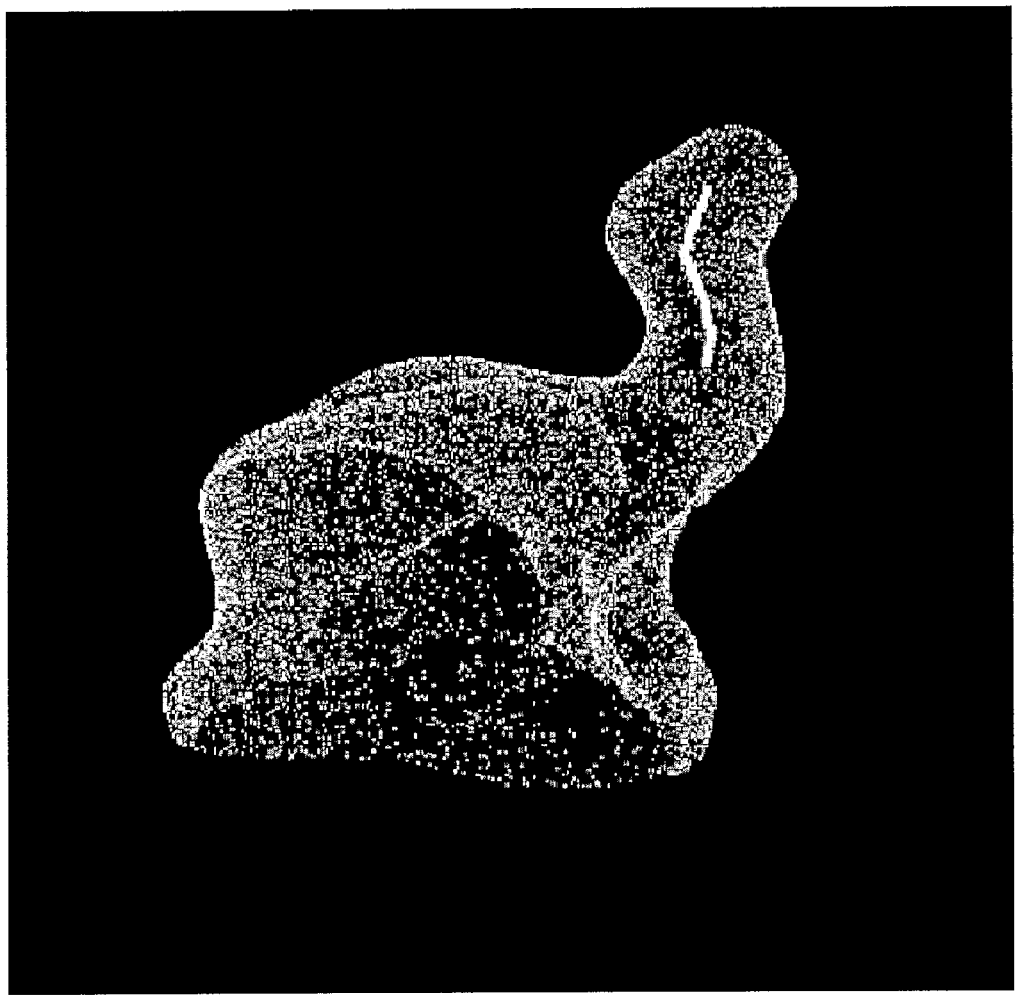
FIG. 6A depicts a centerline for the canal region of the undetailed ear impression model.
Figure 6B:
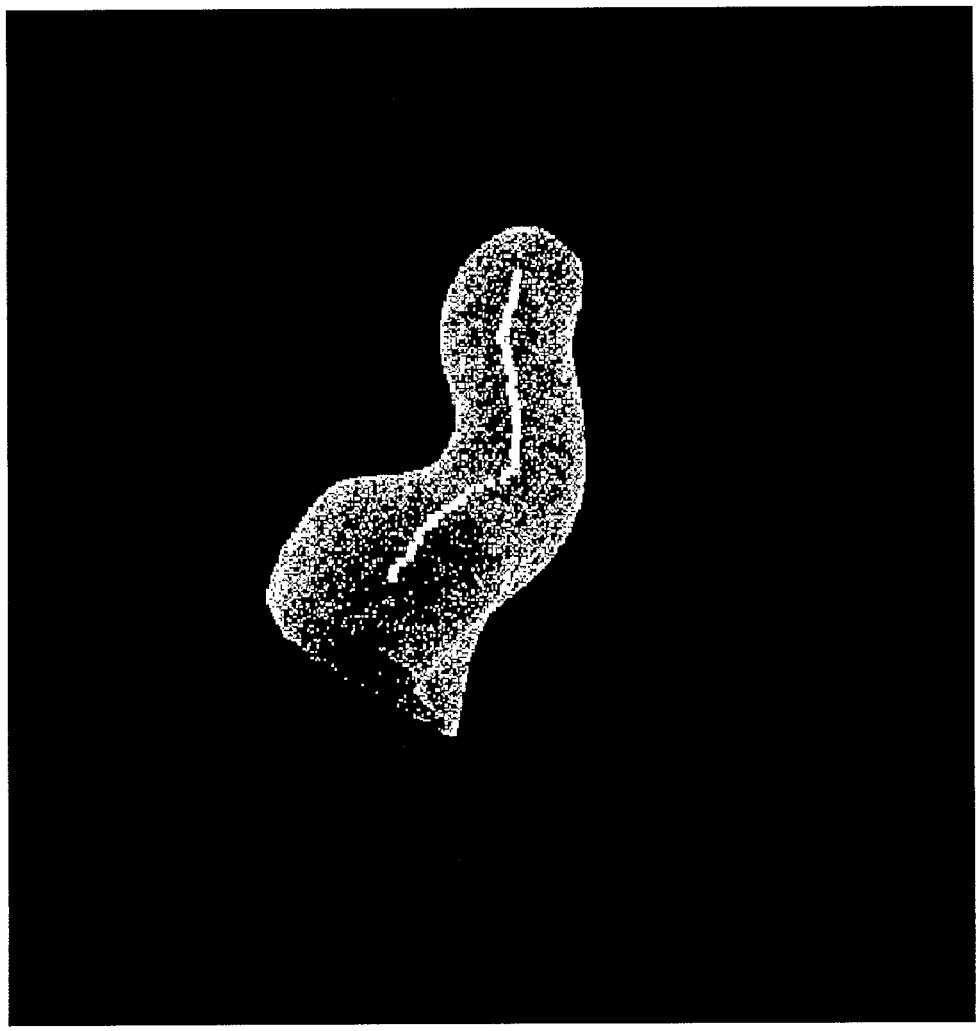
FIG. 6B depicts a centerline for the canal region of the detailed ear impression model.

We want to use the skeletons of U and D to compute the translational shift between U and D. Here, we define a skeleton of the canal region as the set of center points of contours obtained by a surface scanning processes explained in the section entitled "Aperture Detection". FIGS. 6A and 6B show an example of typical centerlines for U and D. A centerline for U (the bold white line in FIG. 6A) consists of only points from tip to aperture, and in a centerline for D (the bold white line in FIG. 6B) all contour center points above the bottom plane are included. We use the same orientation of the scan plane and the same resolution of scan lines for U and D, i.e., the steps between adjacent scan lines are the same. The length of centerline $l_1$ of D is normally longer (has more points) than the length of centerline $l_2$ of U.

Our next objective is to match $l_1$ with $l_2$ by defining a shape distance measure based on approximated local curvatures of skeleton points. Note that we obtain the skeletons after the rotation alignment of U and D, which is crucial for a meaningful correspondence mapping therebetween. In this case, the shape distance measure will become invariant to the orientation of the scanning plane. We tackle the correspondence calculation by means of a dynamic programming algorithm presented in U.S. Patent Application Publication No. 20070057942, entitled, "Method and Apparatus for the Rigid Registration of 3D Ear Impression Shapes with Skeletons", the disclosure of which is incorporated by reference herein in its entirety.

Once the best match between $l_1$ and $l_2$ is found, the mass centers $m_1$ and $m_2$ of the matching skeleton parts is calculated. The difference $m_1 - m_2$ is our correction for the translational shift.

As an alternative method for translation estimation, we outline the approach in A. Makadia, A. Patterson IV, and K. Daniilidis, "Fully Automatic Registration of 3D Point Clouds," Proceedings CVPR'06, 2006, which requires the generation of occupancy functions for range images, $$F(x) = \begin{cases} 1, & \text{if a point was scanned at } x \in \mathbb{R}^3 \\ 0, & \text{otherwise} \end{cases} \quad (2)$$

In our case, these functions can be obtained in the following way. Let $U_s$ and $D_s$ be the point sets of U and D respectively, after rotational alignment. We first compute a bounding box B of $U_s \cup D_s$, whereas the dimensions $\dim_x$, $\dim_y$, $\dim_z$ in each direction are unified as $\dim = \max\{\dim_x, \dim_y, \dim_z\}$. Following, B is subdivided into a voxel grid of size N×N×N, where N is the number of voxels. Let $F_U : N \times N \times N \to \{0,1\}$ be a function that returns 1 if at least one point of $U_s$ is contained in a voxel with index (i, j, k) and 0 otherwise. We use $F_U$ as an occupancy function of U and define $F_D$ of D in the same way. The translational shift $t \in \mathbb{R}^3$ can be computed that maximizes the correlation function $$G(t) = \int_{x \in N^3} F_U(x) F_D(x+t). \quad (3)$$

Since equation (3) is a convolution integral the Fourier transform of the correlation grid G(t) is simply given as $\hat{G} = \hat{F}_U(k) \hat{F}_D(k)$.

Refinement Registration

Figure 7:
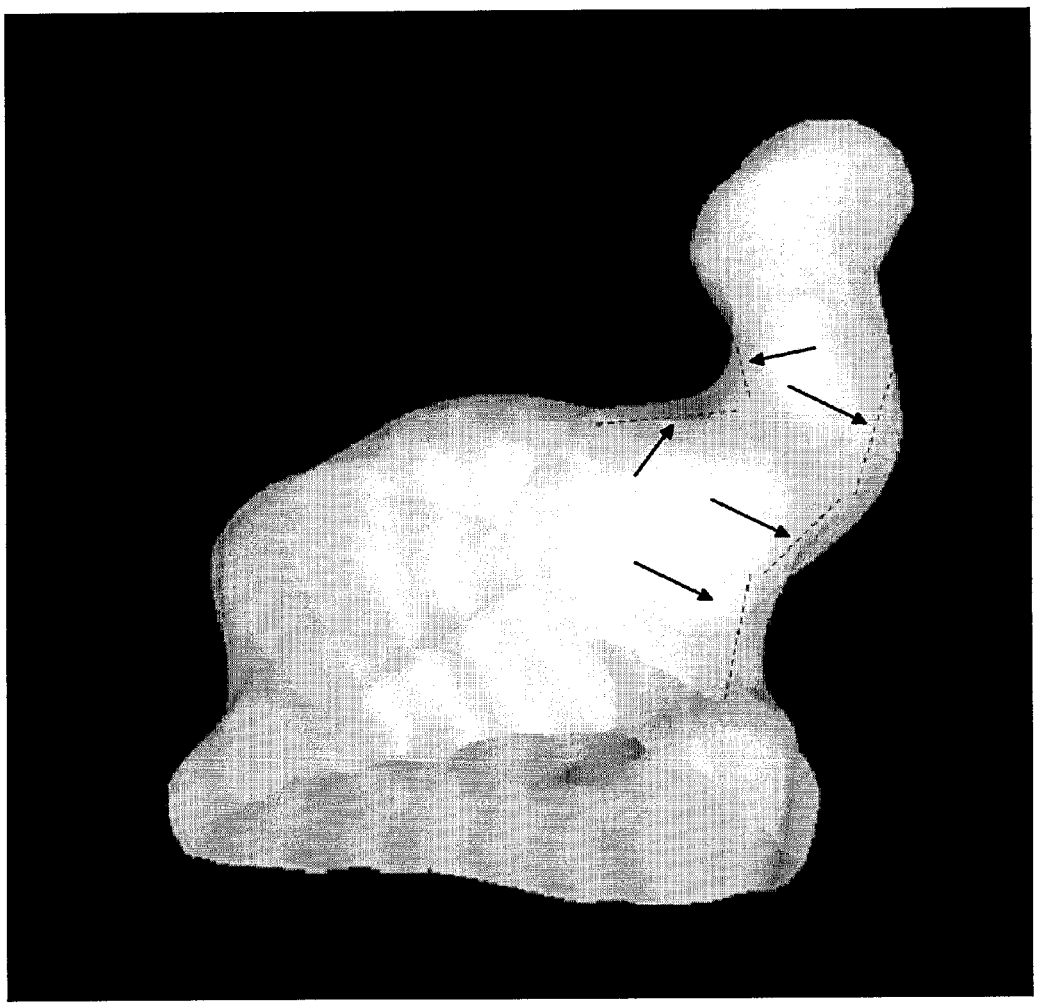
FIG. 7 depicts a transformation result for a crude alignment procedure.

In FIG. 7 the transformation result for the complete crude alignment procedure, including rotation and translation, is presented as an example. Although it looks quite satisfying, a careful observation reveals that small shifts especially in the bottom region of D can sometimes occur. As shown in FIG. 7, these shifts are indicated by the regions located behind the dashed lines and between edges of D. Note that we exclude these regions before the rotational alignment step. Therefore, we can improve our alignment algorithm.

To do this, we use the standard ICP algorithm for final registration of U and D. However, in order to overcome the speed drawback of ICP, U or to be more precise, the center points of all faces of U, are presented in a KD-Tree datastructure to improve search efficiency. For D, we only chose a subset of points in order to avoid unwanted bias of the registration result, i.e., we exclude points close to the tip of D and also points that have no close correspondence to U.

Those points of D, which fulfill the criteria of no close correspondence to U are mostly located in the region of the former concha. The novel ray cast surface distance measure is applied to get hold of these points and to exclude them from the set of registration points.

Ray Cast Surface Distance Measure

The novel ray cast distance measure in accordance with an exemplary embodiment of the present invention will now be described.

The parameterization of a 3D surface triangle can be expressed as $x = v_1 + u \cdot (v_2 - v_1) + w \cdot (v_3 - v_1)$ with $u \in [0,1]$, $w \in [0, 1-u]$, $v_1, v_2, v_3 \in \mathbb{R}^3$. Consider the opposite edge $e_3 = v_2 - v_3$ of vertex $v_1$. Any point p on $e_3$ fulfills the condition $$p = v_1 + e_2 + t \cdot (v_2 - v_3) \quad (4)$$
$$= v_1 + (v_3 - v_1) + t \cdot (v_2 - v_3)$$
$$= v_3 + t \cdot (v_2 - v_3).$$

If we set x=p one obtains $$u \cdot (v_2 - v_1) + w \cdot (v_3 - v_1) = v_3 - v_1 + t \cdot (v_2 - v_3), \quad (5)$$

with $t \in [0,1]$ or in matrix notation $$(e_1, e_2) \begin{pmatrix} u \\ w(u) \end{pmatrix} = c(t) \quad (6)$$

whereas $e_1$, $e_2$ are column vectors. Equations (5) and (6) reduce the set of triangle points to points on the edge $e_3$. Now we resolve this equation for u and ω(u) by setting $M = (e_1, e_2)$ and multiplying equation (6) with $M^T$ and obtain $$M^T M \begin{pmatrix} u \\ w(u) \end{pmatrix} = M^T c(t). \quad (7)$$

Another multiplication of equation (7) with the inverse matrix of $M^TM$ yields $$\begin{pmatrix} u \\ w(u) \end{pmatrix} = (M^TM)^{-1}M^T c(t). \quad (8)$$

Now, in order to use this idea for a ray cast distance measure between triangles of different surfaces, equation (5) changes to $$u \cdot (v_2 - v_1) + w \cdot (v_3 - v_1) = d(t) - v_1.$$

$$d(t) = v_c + t \cdot n, \quad (9)$$

where $t \in \mathfrak{R}, v_c$ is the starting point (e.g., the triangle center) of the outgoing ray and n is the normal direction of the outgoing ray. Using equation (9) in matrix notation leads to $$\begin{pmatrix} u \\ w(u) \end{pmatrix} = (M^TM)^{-1}M^T(d(t) - v_1). \quad (10)$$

In order to solve this equation for u, ω(u), parameter t must be chosen in such a way that d(t) intersects with the plane in which the target triangle lies. Assuming we know t, d(t) only intersects with the target triangle if the parameters u, ω(u) are valid, i.e., u∈[0,1] and ω∈[0,1−u]. In case more than one triangle can be reached by a ray we choose the best one with $$T_i = \underset{i=1}{\overset{M}{\operatorname{argmin}}} \| v_c - t_i \cdot n \|, \, \forall \, i : N_i \cdot n > 0, \quad (11)$$

where $\|N_i\| = \|n\| = 1$, M is the number of triangles penetrated by the current ray and $N_i$ is the unit normal vector of the i-th target triangle.

The plane containing the target triangle is P:Ax+By+Cz=D, where N=(A,B,C) is the unit normal vector of the target triangle under consideration and D is the distance of P from the origin. By setting (x,y,z)=d(t) one obtains the desired value of t $$t = \frac{D - v_c \cdot N}{n \cdot N}, \, n \cdot N \neq 0. \quad (12)$$

As a consequence, all feature points whose ray distances are above the average of all ray distances are removed from the set of feature points.

A flow for creating and using the ray cast distance measure will now be described.

Given the parameterization of a 3D surface triangle with:

$x = v_1 + u(v_2 - v_1) + w(v_3 - v_1), u \in [0,1], w \in [0,1-u]$ and $x, v_1, v_2, v_3 \in R^3$:

a) the matrix $(M^TM)^{-1}M^T$ is calculated for each triangle of the undetailed ear impression model, where $M=(e_1,e_2)$, $e_1, e_2$ are column vectors $e_1 = v_2 - v_1$, $e_2 = v_3 - v_1$.

b) Consider each triangle of the detailed ear impression model to find the corresponding triangle of U.

To execute b), consider all triangles of the undetailed ear impression model for the current triangle of the detailed ear impression model by: computing $$t = \frac{D - v_c \cdot N}{n \cdot N},$$

$n \cdot N \neq 0, \|n\| = \|N\| = 1$, where N is the outward normal vector of the current triangle T of the undetailed ear impression model, D is the Euclidian distance of the plane of T from the origin, $v_c$ is the center of mass of the current triangle of the detailed ear impression model and n is the outward normal vector of the current triangle of the detailed ear impression model.

Apply $$\begin{pmatrix} u \\ w(u) \end{pmatrix} = (M^TM)^{-1}M^T(d(t) - v_1),$$

$$d(t) = v_c + t \cdot n$$

to calculate u, w(u) using the current value of t.

The current considered triangle T of the undetailed ear impression model is a valid corresponding triangle for the current considered triangle of the detailed ear impression model if the following conditions hold: u∈[0,1], w∈[0,1−u], n·N>0.

If the above conditions hold, apply the following rule (Equation 11):
1) If a triangle T* of the undetailed surface has been saved already, go to 2). If not, save the triangle T* of the undetailed ear impression model for the current triangle of the detailed ear impression model.

In addition, save the current (ray length) value $r^* = \|v_c - t \cdot n\|$.
2) If a triangle T* and the parameter r* are found replace T* and r* with the current T and r if r<r*.

After the iteration of b) is finished, each triangle of the detailed ear impression model has at most one corresponding triangle of the undetailed ear impression model and the ray length value r.

Reduce the set S of points of the detailed ear impression model that is used for refinement registration as follows.

Consider all triangles of the detailed ear impression model that posses a corresponding triangle of the undetailed ear impression model and compute the average ray length $\bar{r}$ of all length values r.

Consider all triangles of the detailed ear impression model that posses a corresponding triangle of the undetailed ear impression model and insert the mass center point $v_c$ of the triangle to the set S* if r<$\bar{r}$.

The final set S* of points of the detailed ear impression model is used for refinement registration.

Figure 8:
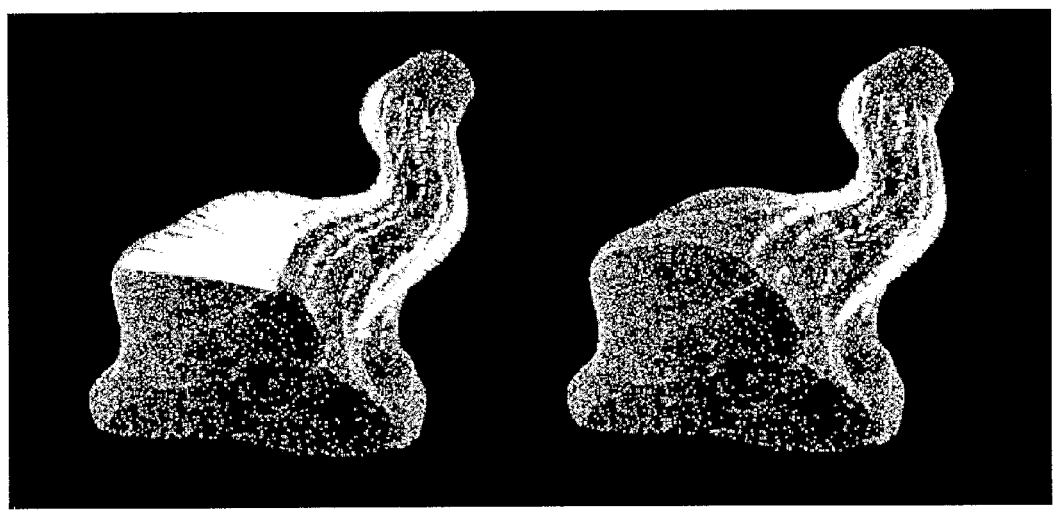
FIG. 8 depicts point selection using a ray cast surface distance measure according to an exemplary embodiment of the present invention.
Figure 9:
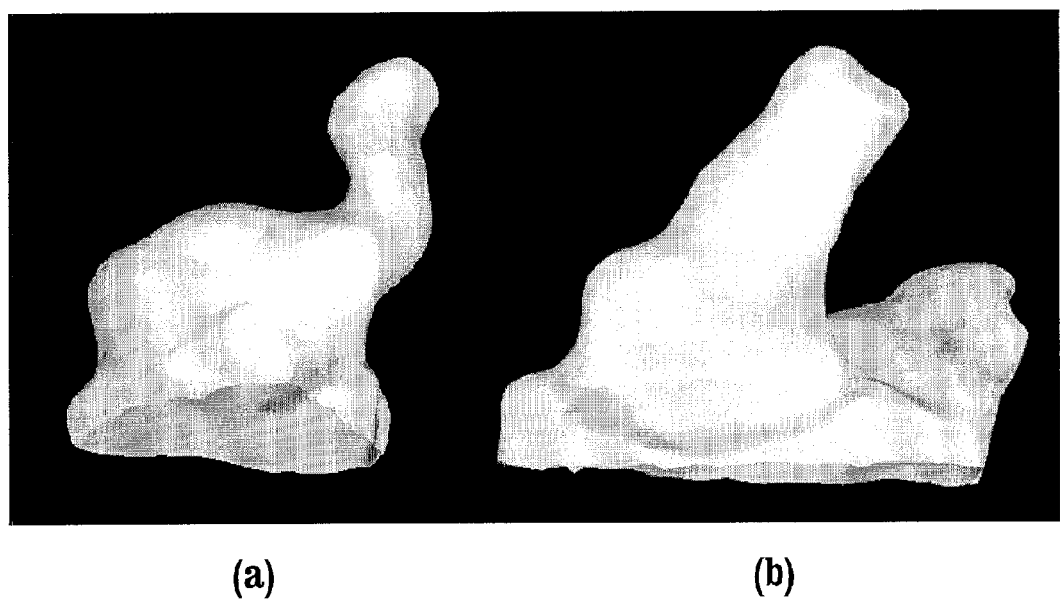
FIG. 9 depicts the undetailed and detailed ear impression models after alignment using the ray cast surface distance measure.

FIG. 8 depicts an undetailed ear impression model (a) together with all rays cast from the faces of D (D is not shown) and (b) the remaining feature points of D after the shifting process. Note that the final registration result includes the rigid transformation parameters (rotation R, translation T) that bring the detailed ear impression model into alignment with the undetailed ear impression model. In this case, all points of the detailed ear impression model are rigidly transformed using the rigid transformation parameters. The detailed ear impression model may then be saved in its registered state and can be used for quality control purposes, such as remakes. An example, of alignment using the ray cast distance measure is shown in FIG. 9. From image (a) of FIG. 9 one can see that the registration result has improved with respect to the bottom region of D compared to FIG. 7. Image (b) of FIG. 9 is the alignment shown in image (a) of FIG. 9 but taken from a different vantage point.

In conclusion, we have tested the above-described method on approximately ten detailed/undetailed pairs, and found the registration to be quite accurate and robust to the data. The entire registration procedure takes less than ten seconds to complete, using unoptimized data structures and code. From experiments we learned that the method achieves satisfying results and fits quality control purposes.

A system in which exemplary embodiments of the present invention may be implemented will now be described.

Figure 10:
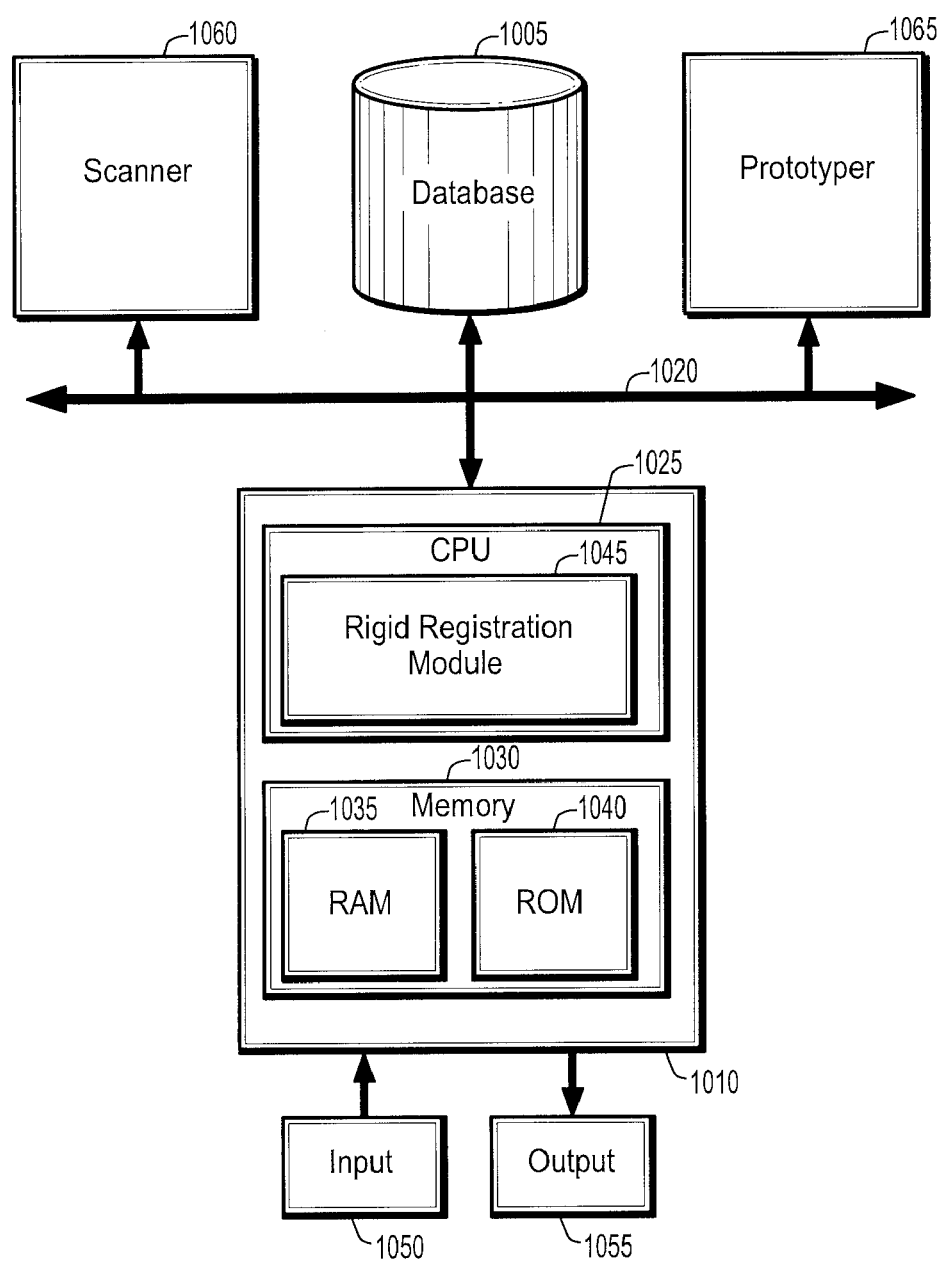
FIG. 10 is a block diagram of a system in which exemplary embodiments of the present invention may be implemented.

As shown in FIG. 10, the system includes a scanner 1060, a personal computer (PC) 1010, a prototyping machine (i.e., prototyper) 1065 and a database 1005 connected over, for example, a wired or wireless network 1020.

The PC 1010, which may be a portable or laptop computer, includes a central processing unit (CPU) 1025 and a memory 1030 which are connected to an input device 1050 and an output device 1055. The CPU 1025 includes a rigid registration module 1045 that includes software for executing methods in accordance with exemplary embodiments of the present invention.

The memory 1030 includes a random access memory (RAM) 1035 and a read-only memory (ROM) 1040. The memory 1030 can also include a database, disk drive, tape drive, etc., or a combination thereof. The RAM 1035 functions as a data memory that stores data used during execution of a program in the CPU 1025 and is used as a work area. The ROM 1040 functions as a program memory for storing a program executed in the CPU 1025. The input 1050 is constituted by a keyboard, mouse, etc., and the output 1055 is constituted by a liquid crystal display (LCD), cathode ray tube (CRT) display, printer, etc.

The scanner 1060, which is used to scan an impression of an ear, may be, for example, an optical, ultrasound, magnetic resonance (MR) or computed tomographic (CT) type 3D scanner.

The prototyper 1065 is used to prototype and/or model (i.e., process) ear shells for hearing aids. The prototyper 1065 may produce a physical version of the ear shell, which becomes a hearing aid, using a prototyping/modeling technique such as Milling, stereo lithography, solid ground curing, selective laser sintering, direct shell production casting, 3D-printing, topographic shell fabrication, fused deposition modeling, inkjet modeling, laminated object manufacturing, nano-printing, etc.

The database 1005 may be used, for example, to store scanned ear impressions, prior detailed ear impression models, prototyped physical versions of detailed ear impression models, etc. and is readily accessible by a user of the PC 1110.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

The above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for rigid registration of ear impression models, comprising:

extracting a canal region from an undetailed ear impression model, the undetailed ear impression model representing an undetailed surface of an ear canal and outer ear geometry;

extracting a canal region from a detailed ear impression model, the detailed ear impression model representing a detailed surface of the ear canal;

generating an orientation histogram for the canal region of the undetailed ear impression model and an orientation histogram for the canal region of the detailed ear impression model;

performing a rotational alignment between the orientation histograms;

computing a translational shift between the extracted canal regions after performing the rotational alignment; and performing a registration between the undetailed and detailed ear impression models after computing the translational shift, wherein performing a registration between the undetailed and detailed ear impression models comprises:

performing a ray cast surface distance measure to identify cloud points of the detailed ear impression model that are near a tip of the canal region of the detailed ear impression model and cloud points of the detailed ear impression model that do not closely correspond to cloud points of the undetailed ear impression model;

representing the cloud points of the undetailed ear impression model in a k-dimensional (KD)-Tree data structure; and performing an iterative closest point (ICP) algorithm on the cloud points of the undetailed ear impression model in the KD-Tree data structure and on the cloud points of the detailed ear impression model except the cloud points of the detailed ear impression model identified by the ray cast surface distance measure.

2. The method of claim 1, wherein the canal region is extracted from the detailed ear impression model by using a length of the canal region of the undetailed ear impression model.

3. The method of claim 1, wherein performing a rotational alignment between the orientation histograms comprises:

representing the canal region of the undetailed ear impression model as an Extended Gaussian image (EGI);

representing the canal region of the detailed ear impression model as an EGI; and computing a correlation function between the EGIs in the Fourier spectrum.

4. The method of claim 1, wherein computing a translational shift between the canal regions comprises:

defining a skeleton of the canal region of the undetailed ear impression model as a set of center points extending from a tip of the canal region of the undetailed ear impression model to an aperture of the undetailed ear impression model, the center points defining a centerline having a first length;

defining a skeleton of the canal region of the detailed ear impression model as a set of center points extending from a tip of the canal region of the detailed ear impression model to a bottom plane of the detailed ear impression model, the center points in the canal region of the detailed ear impression model defining a centerline having a second length, wherein the second length is greater than the first length;

matching the first length with the second length by defining a shape distance measure based on an approximated local curvature of the center points of the undetailed and detailed ear impression models; and computing a mass center of the center points of the undetailed ear impression model that match the center points of the detailed ear impression model and a mass center of the center points of the detailed ear impression model that match the center points of the undetailed ear impression model, wherein a difference between the mass centers is the translational shift.

5. The method of claim 1, wherein the ray cast surface distance measure computes $$t = \frac{D - v_c \cdot N}{n \cdot N}, n \cdot N \neq 0,$$

for a plurality of triangles defining the detailed surface of the ear canal represented by the detailed ear impression model to identify the cloud points of the detailed ear impression model that are near the tip of the canal region of the detailed ear impression model and the cloud points of the detailed ear impression model that do not closely correspond to the cloud points of the undetailed ear impression model, where t is a length of a ray starting at $v_c$ and ending at some point in a plane defined by a triangle under consideration, n is a normal direction of the ray, N is a unit normal vector of the triangle under consideration and D is a distance of the plane from an origin of a Euclidean space.

6. The method of claim 1, further comprising:

aligning the detailed ear impression model with the undetailed ear impression model by using a registration result that is obtained by performing the registration between the undetailed and detailed ear impression models.

7. The method of claim 6, wherein the registration result includes rotation and translation parameters that bring the detailed ear impression model into alignment with the undetailed ear impression model.

8. A system for rigid registration of ear impression models, comprising:

a memory device for storing a program;

a processor in communication with the memory device, the processor operative with the program to:

extract a canal region from an undetailed ear impression model, the undetailed ear impression model representing an undetailed surface of an ear canal and outer ear geometry;

extract a canal region from a detailed ear impression model, the detailed ear impression model representing a detailed surface of the ear canal;

generate an orientation histogram for the canal region of the undetailed ear impression model and an orientation histogram for the canal region of the detailed ear impression model;

perform a rotational alignment between the orientation histograms;

compute a translational shift between the extracted canal regions after performing the rotational alignment; and perform a registration between the undetailed and detailed ear impression models after computing the translational shift, wherein the processor is further operative with the program when performing a registration between the undetailed and detailed ear impression models to:

perform a ray cast surface distance measure to identify cloud points of the detailed ear impression model that are near a tip of the canal region of the detailed ear impression model and cloud points of the detailed ear impression model that do not closely correspond to cloud points of the undetailed ear impression model;

represent the cloud points of the undetailed ear impression model in a k-dimensional (KD)-Tree data structure; and perform an iterative closest point (ICP) algorithm on the cloud points of the undetailed ear impression model in the KD-Tree data structure and on the cloud points of the detailed ear impression model except the cloud points of the detailed ear impression model identified by the ray cast surface distance measure.

9. The system of claim 8, wherein the canal region is extracted from the detailed ear impression model by using a length of the canal region of the undetailed ear impression model.

10. The system of claim 8, wherein the processor is further operative with the program when performing a rotational alignment between the orientation histograms to:

represent the canal region of the undetailed ear impression model as an Extended Gaussian Image (EGI);

represent the canal region of the detailed ear impression model as an EGI; and compute a correlation function between the EGIs in the Fourier spectrum.

11. The system of claim 8, wherein the processor is further operative with the program when computing a translational shift between the canal regions to:

define a skeleton of the canal region of the undetailed ear impression model as a set of center points extending from a tip of the canal region of the undetailed ear impression model to an aperture of the undetailed ear impression model, the center points defining a centerline having a first length;

define a skeleton of the canal region of the detailed ear impression model as a set of center points extending from a tip of the canal region of the detailed ear impression model to a bottom plane of the detailed ear impression model, the center points in the canal region of the detailed ear impression model defining a centerline having a second length, wherein the second length is greater than the first length;

match the first length with the second length by defining a shape distance measure based on an approximated local curvature of the center points of the undetailed and detailed ear impression models; and compute a mass center of the center points of the undetailed ear impression model that match the center points of the detailed ear impression model and a mass center of the center points of the detailed ear impression model that match the center points of the undetailed ear impression model, wherein a difference between the mass centers is the translational shift.

12. The system of claim 8, wherein the processor is further operative with the program to:

align the detailed ear impression model with the undetailed ear impression model by using a registration result that is obtained by performing the registration between the undetailed and detailed ear impression models.

13. The system of claim 12, wherein the registration result includes rotation and translation parameters that bring the detailed ear impression model into alignment with the undetailed ear impression model.

14. A computer readable medium tangibly embodying a program of instructions executable by a processor to perform method steps for rigid registration of ear impression models, the method steps comprising:

extracting a canal region from an undetailed ear impression model, the undetailed ear impression model representing an undetailed surface of an ear canal and outer ear geometry;

extracting a canal region from a detailed ear impression model, the detailed ear impression model representing a detailed surface of the ear canal;

generating an orientation histogram for the canal region of the undetailed ear impression model and an orientation histogram for the canal region of the detailed ear impression model;

performing a rotational alignment between the orientation histograms;

computing a translational shift between the extracted canal regions after performing the rotational alignment; and performing a registration between the undetailed and detailed ear impression models after computing the translational shift, wherein the instructions for performing a registration between the undetailed and detailed ear impression models comprise instructions for:

performing a ray cast surface distance measure to identify cloud points of the detailed ear impression model that are near a tip of the canal region of the detailed ear impression model and cloud points of the detailed ear impression model that do not closely correspond to cloud points of the undetailed ear impression model;

representing the cloud points of the undetailed ear impression model in a k-dimensional (KD)-Tree data structure; and performing an iterative closest point ICP algorithm on the cloud points of the undetailed ear impression model in the KD-Tree data structure and on the cloud points of the detailed ear impression model except the cloud points of the detailed ear impression model identified by the ray cast surface distance measure.

15. The computer readable medium of claim 14, wherein the canal region is extracted from the detailed ear impression model by using a length of the canal region of the undetailed ear impression model.

16. The computer readable medium of claim 14, wherein the instructions for performing a rotational alignment between the orientation histograms comprise instructions for:

representing the canal region of the undetailed ear impression model as an Extended Gaussian Image (EGI); representing the canal region of the detailed ear impression model as an EGI; and computing a correlation function between the EGIs in the Fourier spectrum.

17. The computer readable medium of claim 14, wherein the instructions for computing a translational shift between the canal regions comprise instructions for:

defining a skeleton of the canal region of the undetailed ear impression model as a set of center points extending from a tip of the canal region of the undetailed ear impression model to an aperture of the undetailed ear impression model, the center points defining a centerline having a first length;

defining a skeleton of the canal region of the detailed ear impression model as a set of center points extending from a tip of the canal region of the detailed ear impression model to a bottom plane of the detailed ear impression model, the center points in the canal region of the detailed ear impression model defining a centerline having a second length, wherein the second length is greater than the first length;

matching the first length with the second length by defining a shape distance measure based on an approximated local curvature of the center points of the undetailed and detailed ear impression models; and computing a mass center of the center points of the undetailed ear impression model that match the center points of the detailed ear impression model and a mass center of the center points of the detailed ear impression model that match the center points of the undetailed ear impression model, wherein a difference between the mass centers is the translational shift.

18. The computer readable medium of claim 14 further comprising instructions for:

aligning the detailed ear impression model with the undetailed ear impression model by using a registration result that is obtained by performing a registration between the undetailed and detailed ear impression models.

19. The computer readable medium of claim 18, wherein the registration result includes rotation and translation parameters that bring the detailed ear impression model into alignment with the undetailed ear impression model.

* * * * *